US011143341B2

(12) United States Patent
Winkler, II et al.

(10) Patent No.: US 11,143,341 B2
(45) Date of Patent: Oct. 12, 2021

(54) BALKING TAB TO CONTROL DUCT COUPLING CLOCKING

(71) Applicant: Rohr, Inc., Chula Vista, CA (US)

(72) Inventors: Richard Charles Winkler, II, San Diego, CA (US); William Smith, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 784 days.

(21) Appl. No.: 15/650,582

(22) Filed: Jul. 14, 2017

(65) Prior Publication Data

US 2019/0017638 A1    Jan. 17, 2019

(51) Int. Cl.
  *F16L 23/10* (2006.01)
  *F16L 23/00* (2006.01)
  *F16L 23/04* (2006.01)

(52) U.S. Cl.
  CPC .............. *F16L 23/003* (2013.01); *F16L 23/04* (2013.01); *F16L 23/10* (2013.01); *F16L 2201/10* (2013.01)

(58) Field of Classification Search
  CPC ....... F16L 23/003; F16L 23/006; F16L 23/10; F16L 23/08; F16L 23/04
  See application file for complete search history.

(56) References Cited

U.S. PATENT DOCUMENTS

| 2,269,664 | A | * | 1/1942 | Hallerberg | F16L 23/08 285/332.3 |
| 4,739,542 | A | * | 4/1988 | Krzesicki | F16L 23/10 24/279 |
| 5,228,181 | A | * | 7/1993 | Ingle | B25B 27/16 228/44.5 |
| 5,454,606 | A | * | 10/1995 | Voss | F16L 23/10 24/279 |
| 5,782,499 | A | * | 7/1998 | Gfrerer | F16L 23/08 285/23 |
| 8,657,255 | B2 | | 2/2014 | Goodman et al. | |
| 2014/0217728 | A1 | * | 8/2014 | Ghirardi | F16L 23/08 285/410 |
| 2014/0239633 | A1 | * | 8/2014 | Swingley | F16L 23/0286 285/368 |
| 2016/0230912 | A1 | | 8/2016 | French et al. | |
| 2016/0265702 | A1 | | 9/2016 | Strasik et al. | |
| 2017/0009797 | A1 | | 1/2017 | Rawdon et al. | |
| 2019/0093802 | A1 | * | 3/2019 | Paes | F16L 23/08 |

FOREIGN PATENT DOCUMENTS

DE    102011050321    * 11/2011

* cited by examiner

*Primary Examiner* — Matthew Troutman
*Assistant Examiner* — James A Linford
(74) *Attorney, Agent, or Firm* — Snell & Wilmer L.L.P.

(57) ABSTRACT

A duct arrangement may comprise a duct extending along a centerline axis, a flange coupled to an end of the duct, and a balking feature coupled to a distal surface of the duct and extending axially towards the flange, wherein the balking feature is configured to align a clamp with the flange.

18 Claims, 11 Drawing Sheets

BALKING TAB TO CONTROL DUCT COUPLING CLOCKING

FIELD

This disclosure relates generally to duct couplings, and more particularly to systems and methods for controlling clocking of a duct coupling.

BACKGROUND

Aircraft duct arrangements commonly include flowbodies that are formed (e.g., cast and subsequently machined) to include at least one radial flange that can be mounted to a mating flange provided on a neighboring duct member or other neighboring flowbody. An annular clamp (commonly referred to as a "V-band clamp") having multiple hinged segments and a V-shaped inner geometry, as taken in cross-section, is often utilized to secure the flowbody's radial flange to the neighboring flowbody flange and thereby form a flange-to-flange interface.

In many instances, an aircraft duct arrangement may conduct highly pressurized, highly heated air during operation of the aircraft. For example, the flowbodies of pressurized duct arrangements and manifold pressure duct arrangements often conduct heated, pressurized air bled from the compressor section of a gas turbine engine. To minimize leakage across the flange-to-flange interface, it is desirable to ensure that the radial flanges of such aircraft duct arrangements are secured to neighboring flanges utilizing V-band clamps.

SUMMARY

A duct arrangement is disclosed herein, in accordance with various embodiments. The duct arrangement may comprise a duct extending along a centerline axis; a flange coupled to an end of the duct; and a balking feature coupled to a distal surface of the duct and extending axially towards the flange, wherein the balking feature is configured to align a clamp with the flange.

In various embodiments, the balking feature may physically interfere with the clamp in response to the clamp being misaligned with the flange. The duct arrangement may further comprise a doubler patch coupled between the distal surface of the duct and the balking feature. The doubler patch may be welded to the distal surface of the duct and the balking feature is welded to the doubler patch. The balking feature may be welded to the distal surface of the duct. The balking feature may comprise a piece of sheet metal. The balking feature may be flexible in a radial direction. The balking feature may be flexible in a circumferential direction. The balking feature may be tapered.

A duct arrangement is disclosed herein, in accordance with various embodiments. The duct arrangement may comprise a first duct comprising a first flange; a second duct comprising a second flange; a clamp surrounding the first flange and the second flange, wherein the clamp comprises a first segment and a second segment; a balking feature coupled to the first duct and extending into a gap between the first segment and the second segment, wherein the balking feature prevents the clamp from being installed over the first flange and the second flange unless the gap is aligned with the balking feature.

In various embodiments, the first segment may be hinged. The second segment may be hinged. The balking feature may comprise a piece of sheet metal. The balking feature may be flexible in a radial direction. The balking feature may be flexible in a circumferential direction. The clamp may comprise a V-band clamp. The first flange may be compressed against the second flanged in response to the clamp being tightened.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "distal" refers to the direction radially outward, or generally, away from a centerline axis of a duct. As used herein, "proximal" refers to a direction radially inward, or generally, towards a centerline axis of the duct.

The present disclosure relates to an aircraft duct arrangement. Aircraft duct arrangements commonly include flowbodies that are formed (e.g., machined, forged, or cast and subsequently machined) to include at least one radial flange that can be mounted to a mating flange provided on a neighboring duct member or other neighboring flowbody. An annular clamp (commonly referred to as a "V-band clamp") having multiple hinged segments and a V-shaped inner geometry, as taken in cross-section, is often utilized to secure the flowbody's radial flange to the neighboring flowbody flange and thereby form a flange-to-flange interface.

In many instances, an aircraft valve assembly may conduct highly pressurized, highly heated air during operation of the aircraft. For example, the flowbodies of pressurized duct arrangements and manifold pressure duct arrangements often conduct heated, pressurized air bled from the compressor section of a gas turbine engine. To minimize leakage across the flange-to-flange interface, it is desirable to ensure that the radial flanges of such aircraft duct arrangements are secured to neighboring flanges utilizing V-band clamps. As conventionally designed and implemented, aircraft duct arrangements typically do not include any structural features that prevent or interfere with the perimetrical orientation, or clocking, of the V-band clamp during installation of the clamp around the duct arrangement flange. A hinge, or a latch of the V-band clamp may interfere with adjacent components if the clamp is incorrectly oriented, which may result in mechanical stress, thermal stress, or mechanical interference of the duct arrangement.

Aircraft duct arrangements (or other flowbody assemblies) are disclosed herein including one or more structural features that physically prevent the installation of a clamp in an undesired circumferential orientation, while permitting the installation of the clamp around the duct arrangement flange in a desirable orientation. It may be desirable if embodiments of such an aircraft duct arrangement were relatively straightforward to implement and amenable to fabrication utilizing conventional manufacturing processes. It may also be desirable to provide embodiments of a method for manufacturing such an aircraft duct arrangement.

Figure 1A:
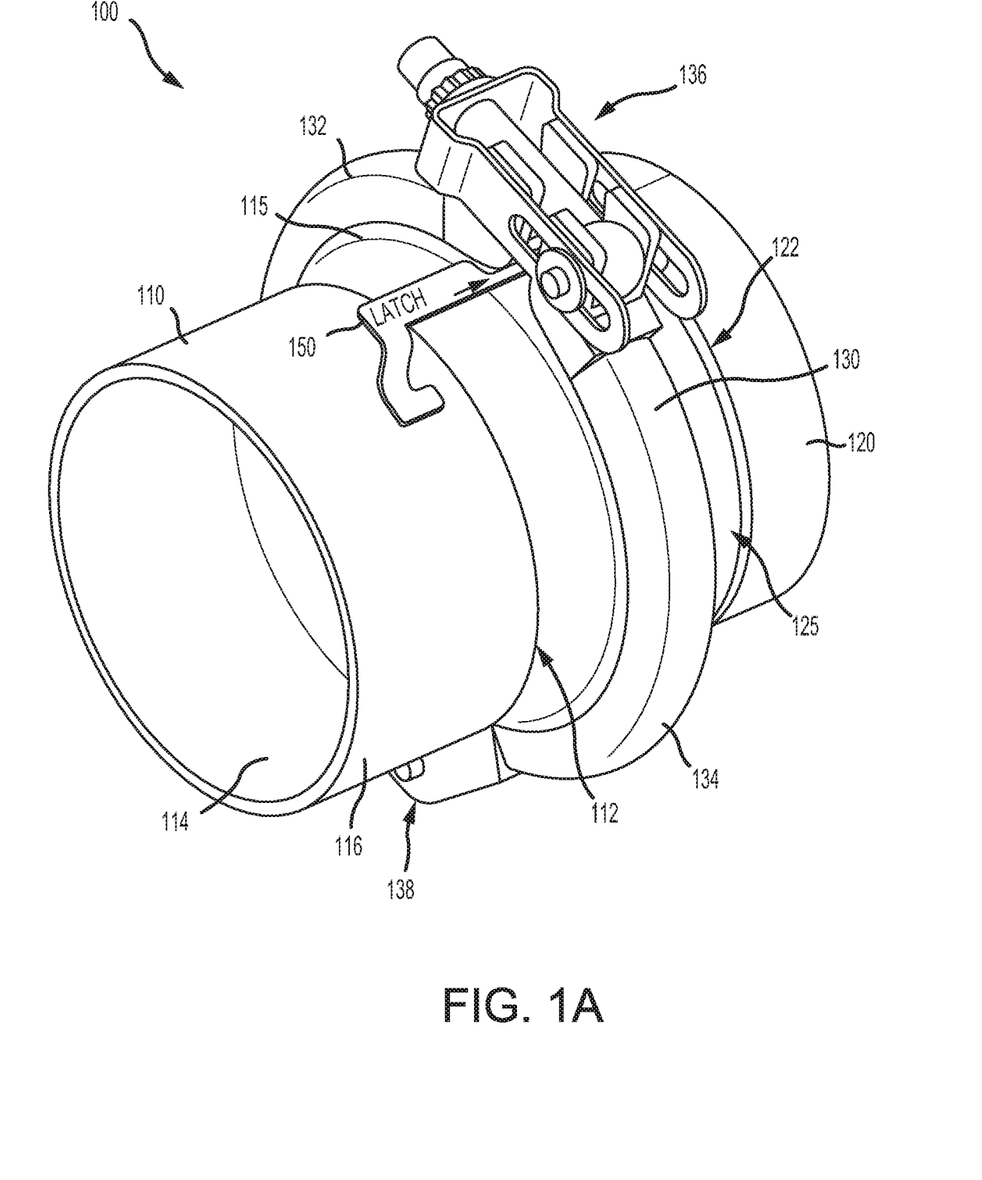
FIG. 1A illustrates a duct arrangement, in accordance with various embodiments.
Figure 1B:
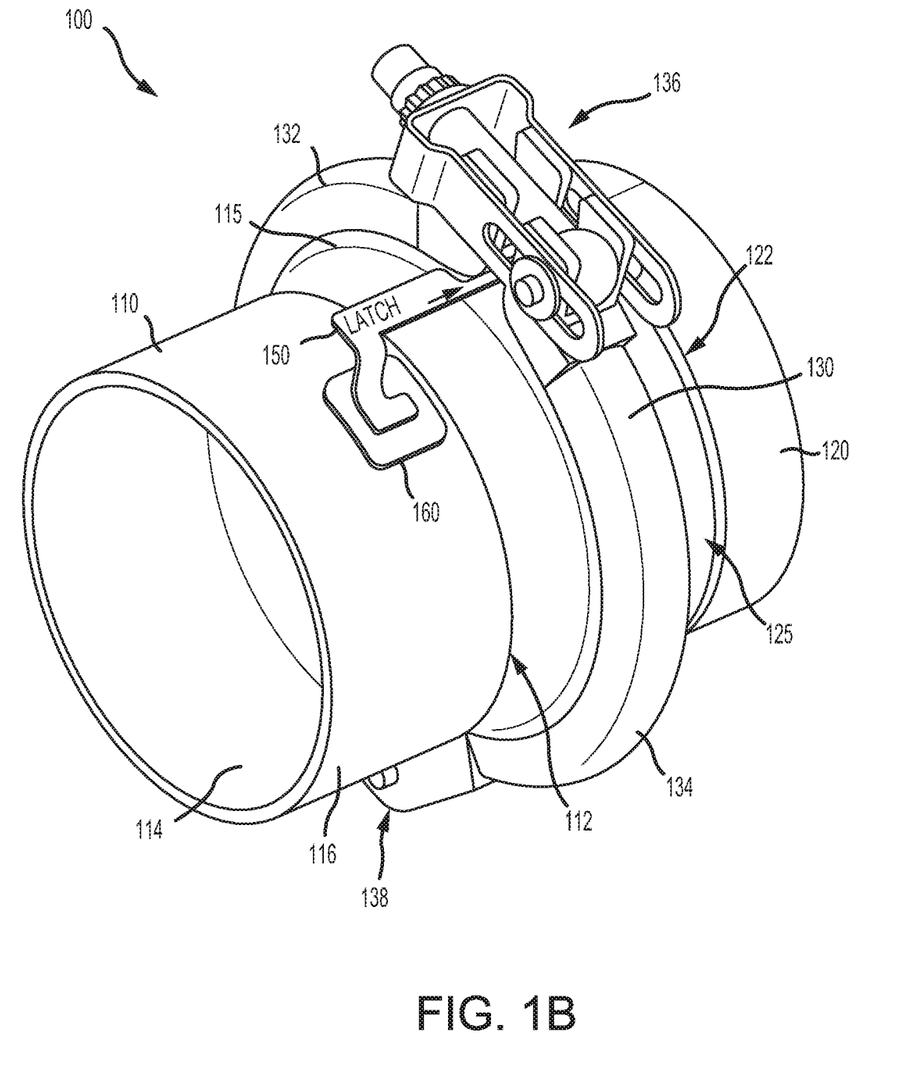
FIG. 1B illustrates a duct arrangement having a doubler patch, in accordance with various embodiments.

With reference to FIG. 1A, a duct arrangement 100 is illustrated, in accordance with various embodiments. Duct arrangement 100 may include a duct (also referred to herein as a first duct) 110 having a flange (also referred to herein as a first flange) 115. Flange 115 may be coupled to an end 112 of duct 110. In various embodiments, flange 115 is welded to end 112 of duct 110. Duct 110 may comprise a proximal surface 114 and a distal surface 116. Proximal surface 114 may be an interior surface of duct 110. Distal surface 116 may be an exterior surface of duct 110. A balking feature 150 may be coupled to distal surface 116. In various embodiments, balking feature 150 is welded to distal surface 116, for example via a fillet weld. As illustrated in FIG. 1B, duct arrangement 100 may further comprise a doubler patch 160, in accordance with various embodiments. Doubler patch 160 may comprise a piece of sheet metal. Doubler patch 160 may be formed to have a geometry that is complementary to distal surface 116. Doubler patch 160 may comprise a segment of a cylinder. In various embodiments, doubler patch 160 is welded to distal surface 116, for example via a fillet weld. Balking feature 150 may be coupled to doubler patch 160. In various embodiments, balking feature 150 is welded to doubler patch 160, for example via a fillet weld. Doubler patch 160 may serve as a sacrificial part. Doubler patch 160 may minimize mechanical stress on duct 110 from balking feature 150.

With reference to FIG. 1A, duct arrangement 100 may further include a duct (also referred to herein as a second duct) 120 having a flange (also referred to herein as a second flange) 125. Flange 125 may be coupled to an end 122 of duct 120. In various embodiments, flange 125 is welded to end 122 of duct 120. Flange 125 may butt against flange 115 in the installed position.

Duct arrangement 100 may further include a clamp 130. Clamp 130 may comprise a V-groove clamp. Clamp 130 may comprise a plurality of segments (illustrated as first segment 132 and second segment 134). First segment 132 may be coupled to second segment 134 via a hinge 138. In this regard, first segment 132 may be hinged and second segment 134 may be hinged. First segment 132 may be coupled to second segment 134 via a latch 136. Latch 136 may be located opposite first and second segments 132, 134 from hinge 138. Although illustrated herein as having two segments, it is contemplated herein that clamp 130 may comprise any number of segments, such as three for example.

In various embodiments, duct arrangement 100 may comprise a pneumatic arrangement configured to route a pressurized fluid. For example, duct arrangement may be in fluid communication with a compressor section of a gas turbine. Duct arrangement 100 may be for an aircraft engine. Clamp 130 may comprise a clamp in accordance with Aerospace Standard 1895 (AS1895). Similarly, flange 115 and flange 125 may comprise flanges in accordance with AS1895. In various embodiments, duct 110, duct 120, flange 115, flange 125, doubler patch 160, balking feature 150, and/or clamp 130 may be made of metal or metal alloys. In various embodiments, duct 110, duct 120, flange 115, flange 125, doubler patch 160, balking feature 150, and/or clamp 130 is made of a nickel superalloy such as an austenitic nickel-chromium-based alloy such as that sold under the trademark Inconel® which is available from Special Metals Corporation of New Hartford, N.Y., USA.

Figure 1C:
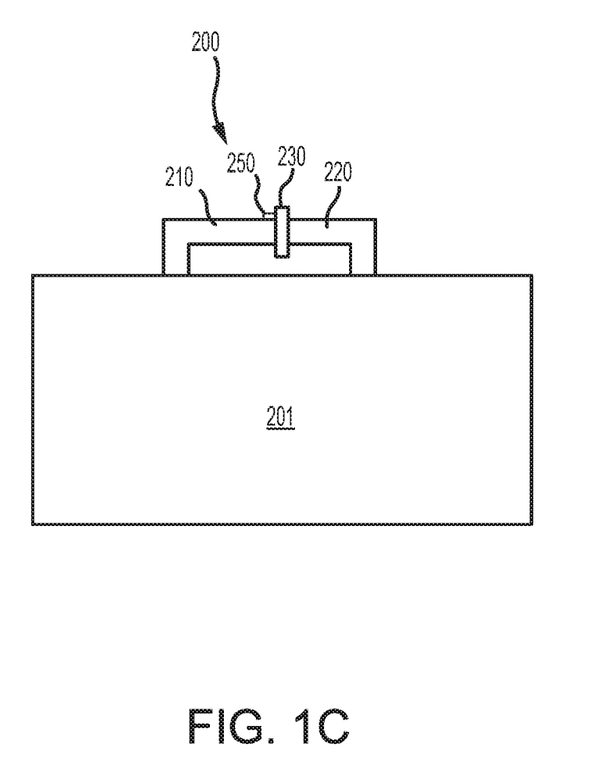
FIG. 1C illustrates a duct arrangement coupled to an engine case, in accordance with various embodiments.

With reference to FIG. 1C, a duct arrangement 200 coupled to an engine case 201 is illustrated, in accordance with various embodiments. Duct arrangement 200 may include a first duct 210 coupled to engine case 201, a second duct 220 coupled to engine case 201, a clamp 230 coupling first duct 210 to second duct 220, and a balking feature 250 coupled to first duct 210. In various embodiments, engine case 201 may be a gas turbine engine case. Duct arrangement 100, with momentary reference to FIG. 1A, may be similar to duct arrangement 200. In various embodiments, first duct 210, second duct 220, clamp 230, and balking feature 250 may be similar to first duct 110, second duct 120, clamp 130, and balking feature 150, respectively.

Figure 2:
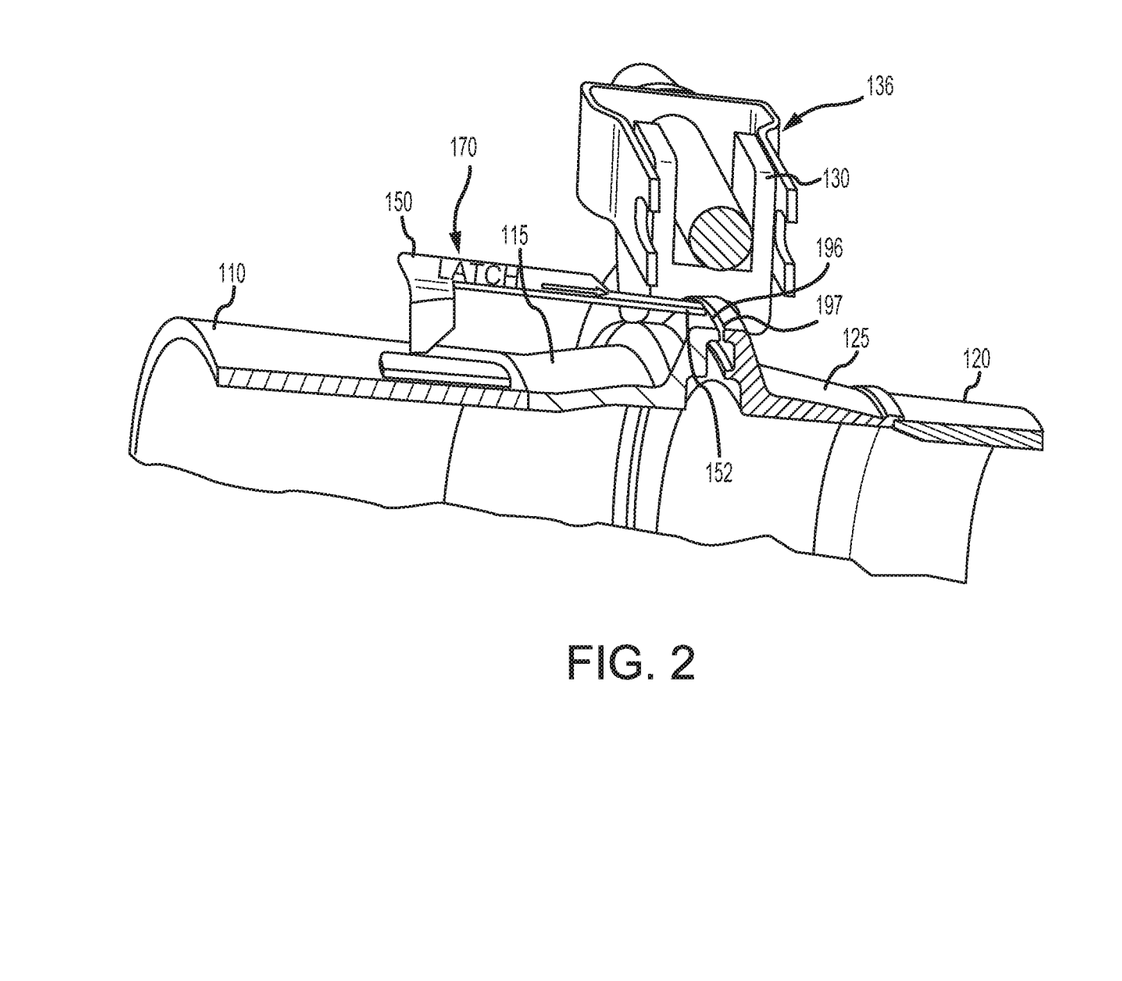
FIG. 2 illustrates a section view of a duct arrangement with an end of a balking feature axially aligned with a portion of a clamp, in accordance with various embodiments.
Figure 3:
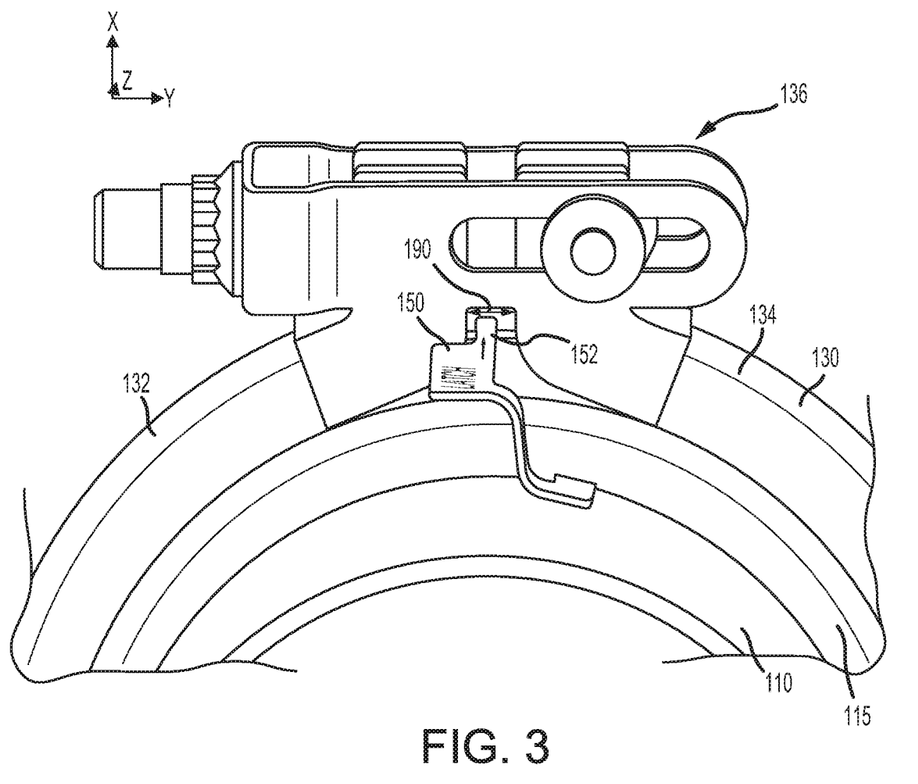
FIG. 3 illustrates a perspective view of a duct arrangement with an end of a balking feature extending into a gap between a first segment and a second segment of a clamp, in accordance with various embodiments.
Figure 4:
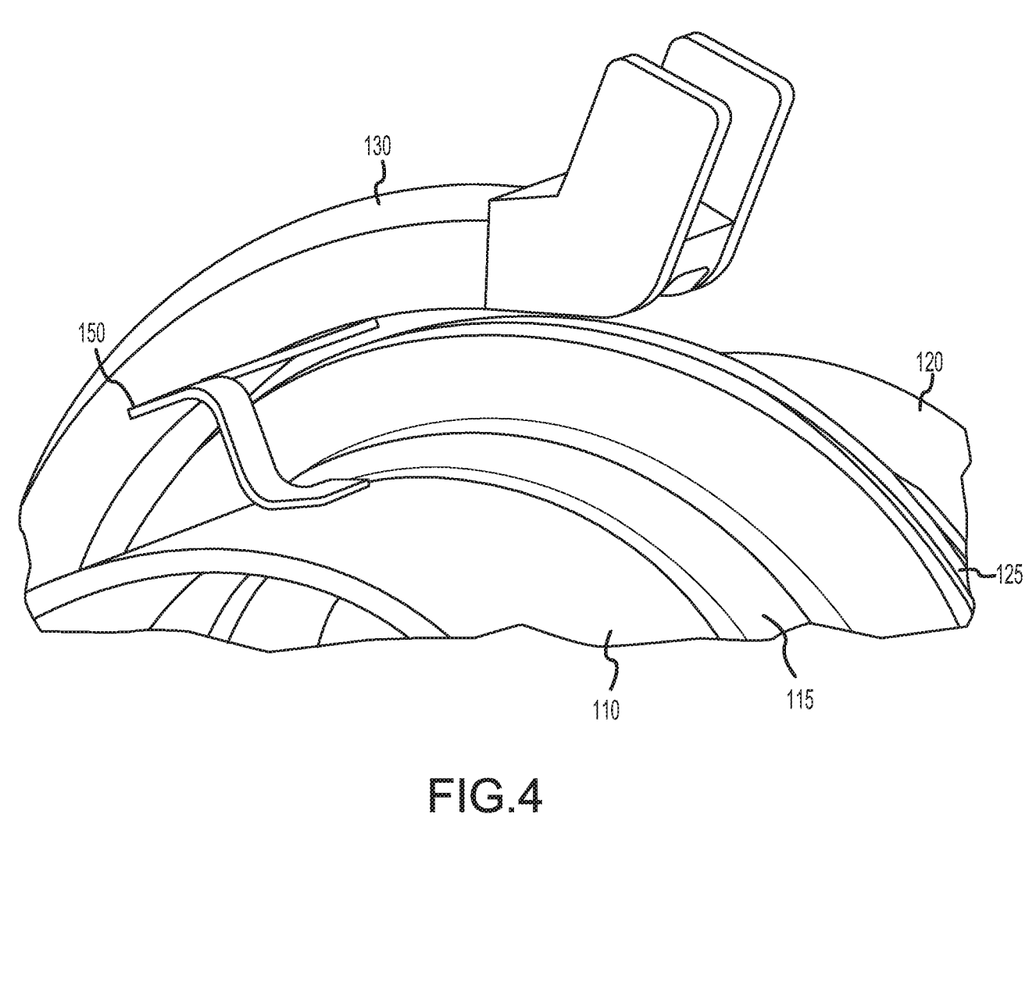
FIG. 4 illustrates a perspective view of a balking feature physically interfering with a segment of a clamp in response to the clamp being misaligned with the balking feature, in accordance with various embodiments.

With combined reference to FIG. 2 and FIG. 3, balking feature 150 may extend from duct 110 over flange 115 such that an end 152 of balking feature 150 is axially aligned with clamp 130. In this regard, clamp 130 can only be properly installed with end 152 located within a gap 190 between first segment 132 and second segment 134. For example, with additional reference to FIG. 4, balking feature 150 may physically interfere with and prevent clamp 130 from being installed over flange 115 and flange 125 unless clamp 130 is properly aligned with balking feature 150 such that balking feature 150 is circumferentially aligned with and extending into gap 190. In this regard, FIG. 4 illustrates clamp 130 misaligned with balking feature 150.

With reference to FIG. 2, balking feature 150 may comprise a visual indicator 170 to indicate a location to which clamp 130 should be aligned. In various embodiments, visual indicator 170 may comprise text, symbols, numbers, colors, or any other visual indicator to indicate a location of clamp 130 to which balking feature 150 should be aligned. In various embodiments, visual indicator 170 may comprise text such as "LATCH" or "HINGE."

In various embodiments, terminus 196 of duct 110 may butt against terminus 197 of duct 120 in the installed position.

With reference to FIG. 3, balking feature 150 may comprise a Z-shape geometry when viewed along the axial direction (i.e., the z-direction). However, it is contemplated herein that balking feature 150 may comprise a U-shape, an S-shape, a C-shape, or any other suitable shape when viewed along the axial direction. For example, balking feature 150 may comprise a piece of sheet metal comprising a base portion 502, a radially extending portion 504, and an axially extending portion 506. Balking feature 150 may comprise a bend 512 between base portion 502 and radially extending portion 504 and a bend 514 between radially extending portion 504 and axially extending portion 506.

In various embodiments, end 152 of balking feature 150 may be tapered to allow end 152 to extend into gap 190, with momentary reference to FIG. 3. In this regard, a width, in the circumferential direction, of end 152 may be less than a width, in the circumferential direction, of gap 190.

Figure 5:
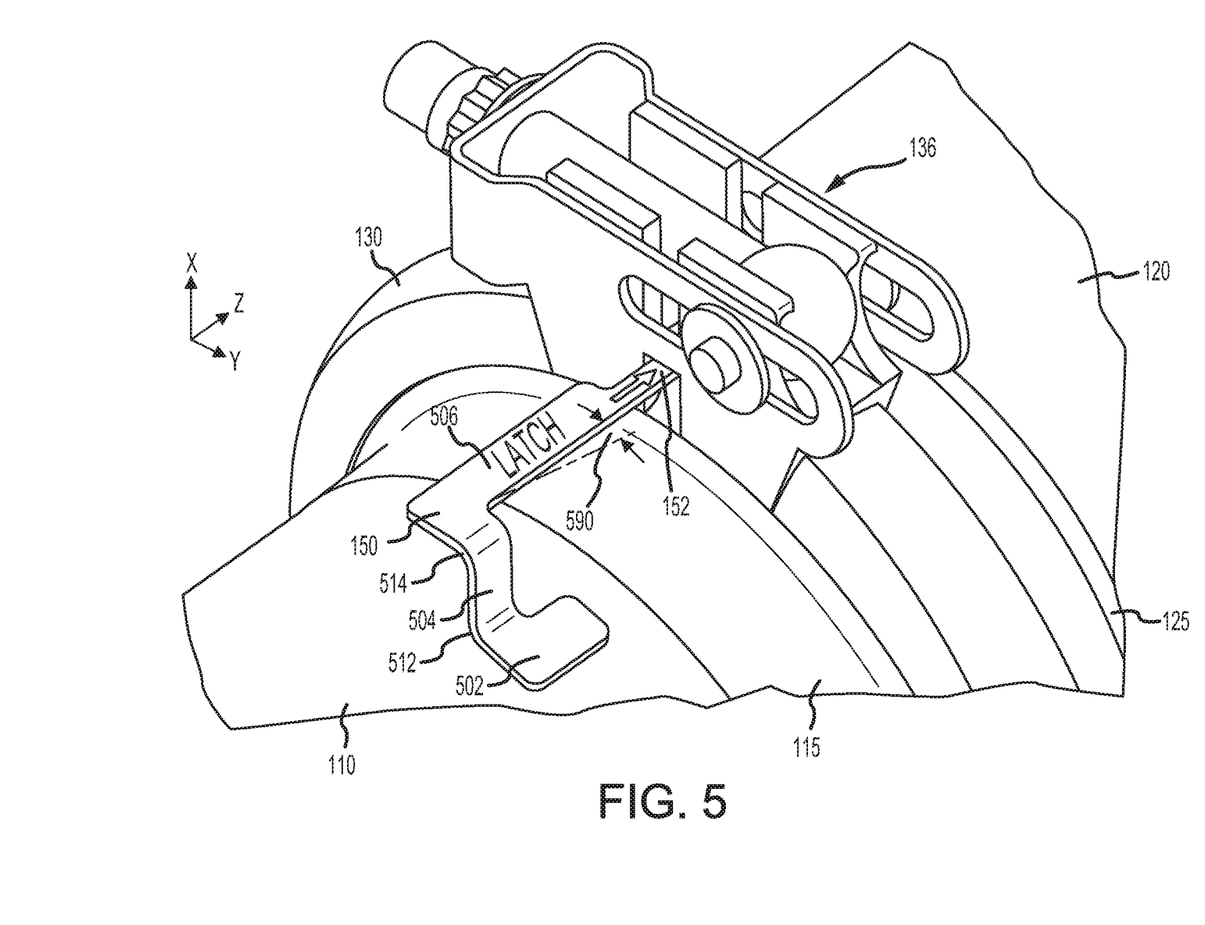
FIG. 5 illustrates a perspective view of a duct arrangement with a balking feature being flexible in a radial direction, in accordance with various embodiments.

With reference to FIG. 5, balking feature 150 may be formed such that end 152 is flexible in the circumferential direction (i.e., the Y-direction). For example, balking feature 150 may flex by an angle 590 in the circumferential direction in response to a circumferential force. Radially extending portion 504 may provide balking feature 150 with flexibility in the circumferential direction. Various members may engage balking feature 150 during installation, such as clamp 130 for example. Thus, the flexibility of balking feature 150 may prevent balking feature 150 from breaking.

Figure 6A:
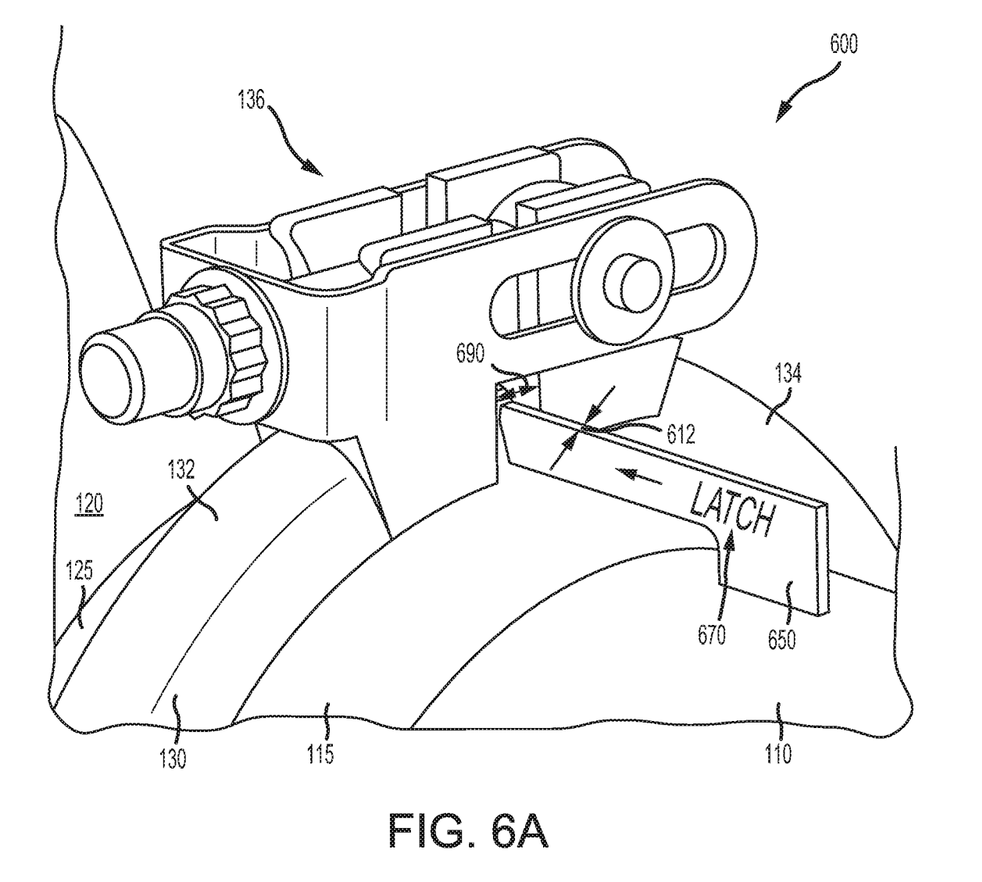
FIG. 6A illustrates a duct arrangement having a balking feature located at a latch side of a clamp, wherein the balking feature comprises a radially and axially extending piece of sheet metal, in accordance with various embodiments.

With reference to FIG. 6A, a duct arrangement 600 is illustrated, in accordance with various embodiments. Duct arrangement 600 may be similar to duct arrangement 100 of FIG. 1A, except that duct arrangement 600 includes a balking feature 650 instead of balking feature 150. Balking feature 650 may have an L-shaped geometry. Balking feature 650 may comprise a piece of sheet metal extending radially from duct 110. In this regard, a circumferential dimension 612 of balking feature 650 may be minimized. Because circumferential dimension 612 is minimized, balking feature 650 may be capable of extending into a smaller gap 690. Balking feature 650 may be flexible in the circumferential direction to allow for minimal movement of clamp 130 in the circumferential direction during installation which may prevent loading between clamp 130 and duct 110.

Figure 6B:
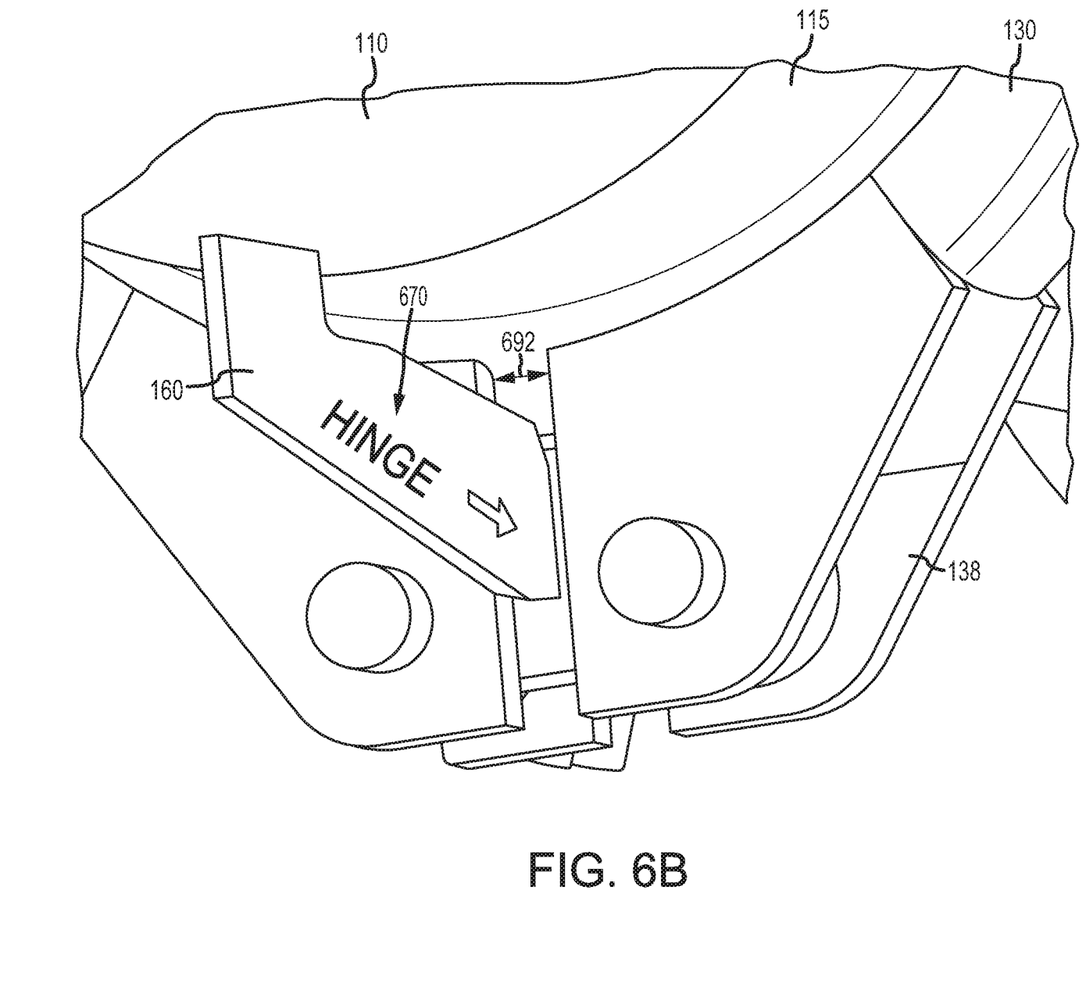
FIG. 6B illustrates a duct arrangement having a balking feature located at a hinge side of a clamp, wherein the balking feature comprises a radially and axially extending piece of sheet metal, in accordance with various embodiments.

With reference to FIG. 6B, balking feature 650 may be located at a hinge side of clamp 130. In this regard, balking feature 650 may extend into a gap 692 between first segment 132 and second segment 134 at hinge 138 of clamp 130.

In various embodiments, balking feature 650 may comprise a visual indicator 670 to indicate a location of clamp 130 to which balking feature 650 should be aligned. In various embodiments, visual indicator 670 may comprise text, symbols, numbers, colors, or any other visual indicator to indicate a location of clamp 130 to which balking feature 650 should be aligned. In various embodiments, visual indicator 670 may comprise text such as "LATCH" as illustrated in FIG. 6A or "HINGE" as illustrated in FIG. 6B.

Figure 7A:
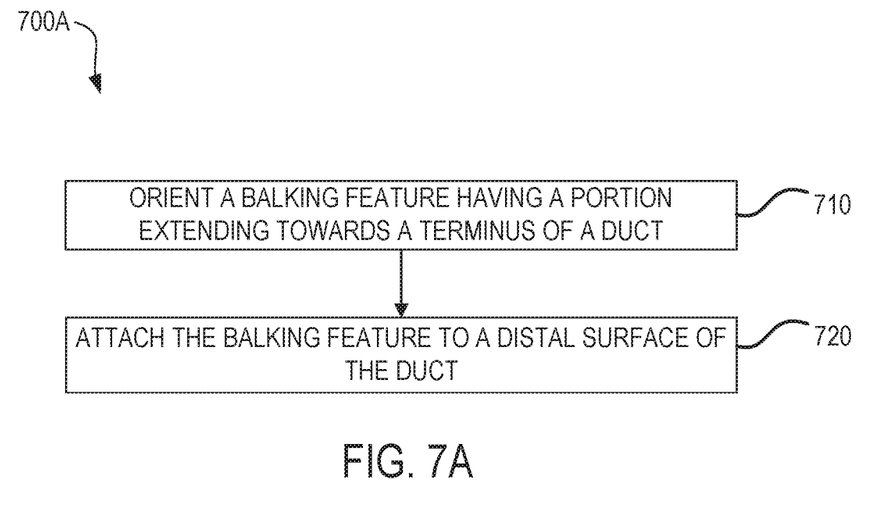
FIG. 7A and FIG. 7B illustrate methods of manufacturing a duct arrangement, in accordance with various embodiments.

With reference to FIG. 7A, a method 700A for manufacturing a duct arrangement is illustrated, in accordance with various embodiments. Method 700A includes orienting a balking feature having a portion extending towards a terminus of a duct (step 710). Method 700A includes attaching the balking feature to a distal surface of the duct (step 720).

With combined reference to FIG. 1A, FIG. 2, and FIG. 7A, step 710 may include orienting balking feature 150 to have end 152 extending towards terminus 196 of duct 110. Step 720 may include attaching balking feature 150 to distal surface 116 of duct 110.

Figure 7B:
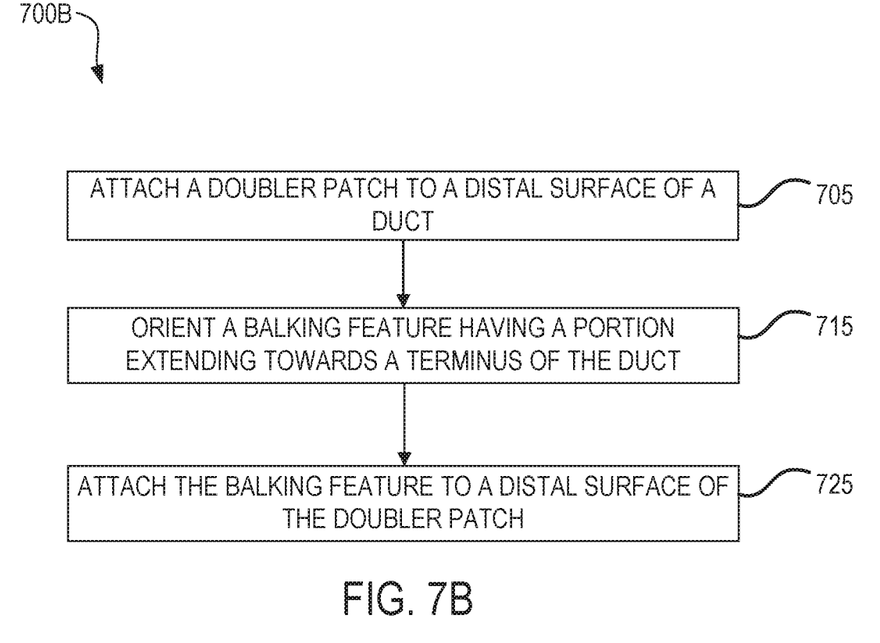

With reference to FIG. 7B, a method 700B for manufacturing a duct arrangement is illustrated, in accordance with various embodiments. Method 700B may be similar to method 700A except that method 700B includes an additional step 705 of attaching a doubler patch to a distal surface of the duct. Step 715 may comprise orienting balking feature 150 to have end 152 extending towards terminus 196 of duct 110. Step 725 may comprise coupling the balking feature to the doubler patch.

With combined reference to FIG. 1B and FIG. 7B, step 705 may include attaching doubler patch 160 to distal surface 116 of duct 110.

Figure 8:
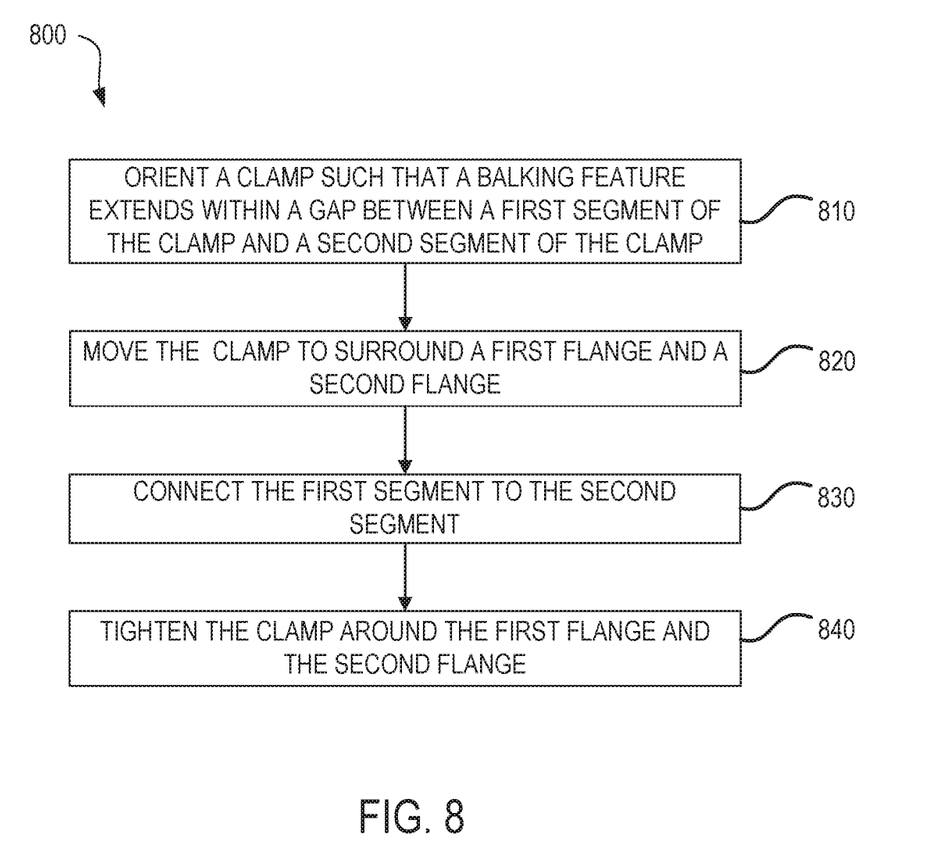
FIG. 8 illustrates a method for coupling a first duct to a second duct, in accordance with various embodiments.

With reference to FIG. 8, a method 800 for coupling a first duct to a second duct is illustrated, in accordance with various embodiments. Method 800 includes orienting a clamp such that a balking feature extends within a gap between a first segment of the clamp and a second segment of the clamp (step 810). Method 800 includes moving the clamp to surround a first flange and a second flange (step 820). Method 800 includes connecting the first segment to the second segment (step 830). Method 800 includes tightening the clamp around the first flange and the second flange (step 840).

With combined reference to FIG. 1A, FIG. 3 and FIG. 8, step 810 may include orienting clamp 130 such that balking feature 150 extends within gap 190 between first segment 132 and second segment 134. Step 820 may include moving clamp 130 to surround first flange 115 and second flange 125. Step 830 may include connecting first segment 132 to second segment 134 via latch 136. Step 840 may include tightening clamp 130 around first flange 115 and second flange 125, via latch 136.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A duct arrangement, comprising: a duct extending along a centerline axis; a flange coupled to an end of the duct; and a balking feature coupled to a distal surface of the duct, wherein the balking feature is configured to align a annular clamp with the flange; the balking feature extends axially towards the flange from the duct when the annular clamp is in an installed position; and a free end of the balking feature is configured to be spaced apart from the annular clamp and a latch of the clamp and spaced apart from the duct when the annular clamp is in the installed position, and the free end of the balking feature is located radially between the latch and the flange.

2. The duct arrangement of claim 1, wherein the balking feature physically interferes with the annular clamp in response to the annular clamp being misaligned with the flange.

3. The duct arrangement of claim 1, further comprising a doubler patch coupled between the distal surface of the duct and the balking feature.

4. The duct arrangement of claim 3, wherein the doubler patch is welded to the distal surface of the duct and the balking feature is welded to the doubler patch.

5. The duct arrangement of claim 1, wherein the balking feature is welded to the distal surface of the duct.

6. The duct arrangement of claim 1, wherein the balking feature comprises a piece of sheet metal.

7. The duct arrangement of claim 1, wherein the balking feature is flexible in a radial direction.

8. The duct arrangement of claim 1, wherein the balking feature is flexible in a circumferential direction.

9. The duct arrangement of claim 1, wherein the balking feature is tapered.

10. A duct arrangement, comprising: a first duct comprising a first flange; a second duct comprising a second flange; a clamp circumferentially surrounding the first flange and the second flange, wherein the clamp comprises a first segment and a second segment; a balking feature coupled to the first duct and extending from the first duct into a gap between the first segment and the second segment when the clamp is in an installed position, wherein the balking feature prevents the clamp from being installed over the first flange and the second flange unless the gap is aligned with the balking feature, and the balking feature comprises: a base portion fixed to the first duct, and an axially extending portion extending from the base portion, wherein a free end of the axially extending portion is disposed radially between the clamp and the first duct.

11. The duct arrangement of claim 10, wherein the first segment is hinged.

12. The duct arrangement of claim 10, wherein the second segment is hinged.

13. The duct arrangement of claim 10, wherein the balking feature comprises a piece of sheet metal.

14. The duct arrangement of claim 10, wherein the balking feature is flexible in a radial direction.

15. The duct arrangement of claim 10, wherein the balking feature is flexible in a circumferential direction.

16. The duct arrangement of claim 10, wherein the clamp comprises a V-band clamp.

17. The duct arrangement of claim 10, wherein the first flange is compressed against the second flanged in response to the clamp being tightened.

18. The duct arrangement of claim 10, wherein the balking feature is located at a latch side of the clamp.

* * * * *